(12) United States Patent
Burstein et al.

(10) Patent No.: US 10,552,367 B2
(45) Date of Patent: Feb. 4, 2020

(54) NETWORK DATA TRANSACTIONS USING POSTED AND NON-POSTED OPERATIONS

(71) Applicant: Mellanox Technologies, Ltd., Yokneam (IL)

(72) Inventors: Idan Burstein, Carmiel (IL); Diego Crupnicoff, Buenos Aires (AR)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 182 days.

(21) Appl. No.: 15/659,876

(22) Filed: Jul. 26, 2017

(65) Prior Publication Data
US 2019/0034381 A1    Jan. 31, 2019

(51) Int. Cl.
G06F 15/167    (2006.01)
G06F 15/173    (2006.01)
H04L 29/06     (2006.01)

(52) U.S. Cl.
CPC ...... *G06F 15/167* (2013.01); *G06F 15/17331* (2013.01); *H04L 67/42* (2013.01)

(58) Field of Classification Search
CPC ... G06F 15/167; G06F 15/17331; H04L 67/42
See application file for complete search history.

(56) References Cited

U.S. PATENT DOCUMENTS

| | | |
|---|---|---|
| 5,434,975 A | 7/1995 | Allen |
| 5,913,213 A | 6/1999 | Wikstrom et al. |
| 5,948,062 A | 9/1999 | Tzelnic et al. |
| 5,987,552 A | 11/1999 | Chittor et al. |
| 6,038,651 A | 3/2000 | Van Huben et al. |
| 6,044,438 A | 3/2000 | Olnowich |
| 6,092,155 A | 7/2000 | Olnowich |
| 6,108,764 A | 8/2000 | Baumgartner et al. |
| 6,154,816 A | 11/2000 | Steely et al. |
| 6,275,907 B1 | 8/2001 | Baumgartner et al. |
| 6,338,122 B1 | 1/2002 | Baumgartner et al. |

(Continued)

OTHER PUBLICATIONS

Shah et al., "Remote Direct Memory Access (RDMA) Protocol Extensions", Request for Comments: 7306, pp. 1-34, Jun. 2014.

(Continued)

*Primary Examiner* — Tonia L Dollinger
*Assistant Examiner* — Steven C Nguyen
(74) *Attorney, Agent, or Firm* — Kligler & Associates Patent Attorneys Ltd

(57) ABSTRACT

Communication apparatus includes a host interface, configured to be coupled to a host processor having a host memory, and a network interface, which is configured to receive over a network from a sending node data packets conveying operations for execution in a sequential order on a predefined queue pair (QP), including at least a first packet conveying a posted write operation and a second packet conveying a non-posted write operation. Packet processing circuitry is configured to execute the posted write operation in accordance with the sequential order so as to write first data to the host memory prior to the execution of any subsequent operations in the sequential order, and to execute the non-posted write operation so as to write second data to the host memory while allowing one or more of the subsequent operations in the sequential order to be executed prior to completion of writing the second data.

40 Claims, 3 Drawing Sheets

(56) References Cited

U.S. PATENT DOCUMENTS

| | | | |
|---|---|---|---|
| 6,490,662 B1 | 12/2002 | Pong et al. | |
| 6,523,066 B1 | 2/2003 | Montroy et al. | |
| 7,376,800 B1 | 5/2008 | Choquette | |
| 7,496,698 B2 * | 2/2009 | Biran | G06F 13/1657 709/228 |
| 7,640,545 B2 | 12/2009 | Kuman et al. | |
| 7,688,838 B1 * | 3/2010 | Aloni | G06F 13/128 370/412 |
| 8,213,315 B2 | 7/2012 | Crupnicoff et al. | |
| 8,761,189 B2 | 6/2014 | Shachar et al. | |
| 9,164,702 B1 | 10/2015 | Nesbit et al. | |
| 9,699,110 B2 | 7/2017 | Goldenberg et al. | |
| 2003/0084038 A1 | 5/2003 | Balogh et al. | |
| 2004/0193734 A1 | 9/2004 | Barron et al. | |
| 2005/0144339 A1 | 6/2005 | Wagh et al. | |
| 2006/0123156 A1 | 6/2006 | Moir et al. | |
| 2007/0079075 A1 | 4/2007 | Collier et al. | |
| 2009/0113443 A1 | 4/2009 | Heller, Jr. et al. | |
| 2010/0017572 A1 | 1/2010 | Koka et al. | |
| 2010/0106948 A1 | 4/2010 | Bellows et al. | |
| 2010/0191711 A1 | 7/2010 | Carey et al. | |
| 2010/0313208 A1 | 12/2010 | Zarzycki et al. | |
| 2011/0099335 A1 | 4/2011 | Scott et al. | |
| 2011/0239043 A1 * | 9/2011 | Vedder | G06F 1/263 714/14 |
| 2012/0023295 A1 | 1/2012 | Nemawarkar | |
| 2012/0179877 A1 | 7/2012 | Shriraman et al. | |
| 2012/0310987 A1 | 12/2012 | Dragojevic et al. | |
| 2012/0311213 A1 * | 12/2012 | Bender | G06F 13/364 710/113 |
| 2013/0019000 A1 | 1/2013 | Markus et al. | |
| 2013/0290473 A1 | 10/2013 | Chen et al. | |
| 2013/0315237 A1 * | 11/2013 | Kagan | H04L 69/321 370/389 |
| 2014/0025884 A1 | 1/2014 | Stark et al. | |
| 2014/0040551 A1 | 2/2014 | Blainey et al. | |
| 2014/0040557 A1 | 2/2014 | Frey et al. | |
| 2014/0047060 A1 | 2/2014 | Chen et al. | |
| 2014/0047205 A1 | 2/2014 | Frey et al. | |
| 2014/0068201 A1 | 3/2014 | Fromm | |
| 2014/0101390 A1 | 4/2014 | Sohi et al. | |
| 2014/0181823 A1 | 6/2014 | Manula et al. | |
| 2015/0052313 A1 | 2/2015 | Ghai et al. | |
| 2015/0052315 A1 | 2/2015 | Ghai et al. | |
| 2015/0095600 A1 | 4/2015 | Bahnsen et al. | |
| 2015/0100749 A1 | 4/2015 | Koker et al. | |
| 2015/0253997 A1 | 9/2015 | Kessler et al. | |
| 2015/0254104 A1 | 9/2015 | Kessler et al. | |
| 2015/0254182 A1 | 9/2015 | Asher et al. | |
| 2015/0254183 A1 | 9/2015 | Akkawi et al. | |
| 2015/0254207 A1 | 9/2015 | Kessler | |
| 2015/0269116 A1 | 9/2015 | Raikin et al. | |
| 2016/0043965 A1 | 2/2016 | Raikin et al. | |
| 2017/0255559 A1 | 9/2017 | Burstein et al. | |
| 2017/0255590 A1 | 9/2017 | Shuler et al. | |

OTHER PUBLICATIONS

Dragojevic et al., "FaRM: Fast Remote Memory", 11th USENIX Symposium on Networked Systems Design and Implementation, pp. 401-414, year 2014.

U.S. Appl. No. 15/444,345 office action dated Jan. 18, 2019.

Hammond et al., "Transactional Memory Coherence and Consistency", Proceedings of the 31st annual international symposium on Computer architecture, vol. 32, issue 2, 12 pages, Mar. 2004.

InfiniBand Architecture Specification, vol. 1, Release 1.2.1, 1727 pages, 2007.

Supplement to InfiniBand Architecture Specification vol. 1.2.1, Annex A14: "Extended Reliable Connected (XRC) Transport Service", Revision 1.0, 43 pages, Mar. 2, 2009.

Raman, A, "Transactional Memory-Implementation", Lecture 1, Princeton University, 63 pages, Fall 2010.

PCI Express® Base Specification, Revision 3.1 , 1073 pages, Mar. 2014.

Mellanox Technologies, Inc. "Mellanox IB-Verbs API (VAPI)", Mellanox Software Programmer's Interface for InfiniBand Verbs, 78 pages, year 2001.

European Application # 171597461 Search Report dated Jul. 25, 2017.

U.S. Appl. No. 14/665,043 office action dated Aug. 25, 2017.

U.S. Appl. No. 15/444,345 office action dated Aug. 1, 2019.

* cited by examiner

NETWORK DATA TRANSACTIONS USING POSTED AND NON-POSTED OPERATIONS

FIELD OF THE INVENTION

The present invention relates generally to data communications, and specifically to devices and protocols for exchanging data between nodes over a packet data network.

BACKGROUND

InfiniBand™ (IB) is a switched-fabric communications architecture that is widely used in high-performance computing. It has been standardized by the InfiniBand Trade Association in the InfiniBand™ Architecture Specification Volume 1 (Release 1.3, Mar. 3, 2015). Computing devices (host processors and peripherals) connect to the IB fabric via a network interface controller (NIC), which is referred to in IB parlance as a channel adapter. Host processors (or hosts) use a host channel adapter (HCA), while peripheral devices use a target channel adapter (TCA).

Client processes running on a host processor, such as software application processes, communicate with the transport layer of the IB fabric by manipulating a transport service instance, known as a "queue pair" (QP), made up of a send work queue and a receive work queue. To send and receive messages over the network using a HCA, the client initiates work requests (WRs), which cause work items, called work queue elements (WQEs), to be placed onto the appropriate work queues. Normally, each WR has a data buffer associated with it, to be used for holding the data that is to be sent or received in executing the WQE. The HCA executes the WQEs and thus communicates with the corresponding QP of the channel adapter at the other end of the link. After it has finished servicing a WQE, the HCA typically writes a completion report, in the form of a completion queue element (CQE), to a completion queue, to be read by the client as an indication that the work request has been executed.

IB channel adapters implement various service types and transport operations, including remote direct memory access (RDMA) read and write operations, as well as send operations. Both RDMA write and send requests carry data sent by a channel adapter (known as the requester) and cause another channel adapter (the responder) to write the data to a memory address at its own end of the link. Whereas RDMA write requests specify the address in the remote responder's memory to which the data are to be written, send requests rely on the responder to determine the memory location at the request destination.

Upon receiving a send request addressed to a certain QP, the channel adapter at the destination node places the data sent by the requester into the next available receive buffer for that QP and generates a CQE to notify the responder as to the location of the data. To specify the receive buffers to be used for such incoming send requests, a client process on the host computing device generates receive WQEs and places them in the receive queues of the appropriate QPs. Each time a valid send request is received, the destination channel adapter takes the next WQE from the receive queue of the destination QP and places the received data in the memory location specified in that WQE. Thus, every valid incoming send request engenders a receive queue operation by the responder.

U.S. Patent Application Publication 2015/0269116, whose disclosure is incorporated herein by reference, describes remote transactions using transactional memory, which are carried out over a data network between an initiator host and a remote target. The transaction comprises a plurality of input-output (IO) operations between an initiator network interface controller and a target network interface controller. The IO operations are controlled by the initiator network interface controller and the target network interface controller to cause the first process to perform accesses to the memory location atomically.

SUMMARY

Embodiments of the present invention that are described hereinbelow provide improved apparatus and methods for conveying data over a network.

There is therefore provided, in accordance with an embodiment of the invention, communication apparatus, including a host interface, configured to be coupled to a host processor having a host memory, and a network interface, which is configured to receive over a network from a sending node data packets conveying operations for execution in a sequential order on a predefined queue pair (QP), including at least a first packet conveying a posted write operation and a second packet conveying a non-posted write operation. Packet processing circuitry is configured to execute the posted write operation in accordance with the sequential order so as to write first data to the host memory prior to the execution of any subsequent operations in the sequential order, and to execute the non-posted write operation so as to write second data to the host memory while allowing one or more of the subsequent operations in the sequential order to be executed prior to completion of writing the second data.

In some embodiments, the non-posted write operation includes a remote direct memory access (RDMA) write operation. In one embodiment, the RDMA write operation includes a non-posted RDMA write with immediate operation, which causes the packet processing circuitry to write the second data to the host memory while queuing the RDMA write in a response queue, and to write a completion queue element (CQE) to the host memory only after execution and completion of one or more preceding non-posted operations.

Additionally or alternatively, the non-posted write operation includes an atomic operation, which causes the packet processing circuitry to read a first value from a specified address in the host memory and responsively to the first value, to write a second value to the specified address. In a disclosed embodiment, the packet processing circuitry is configured to queue non-posted operations for execution in a response queue, including the non-posted atomic operation, and to block execution of the non-posted atomic operation and acknowledgment of the non-posted atomic operation to the sending node until at least one preceding non-posted operation in the response queue has been completed Further additionally or alternatively, the non-posted write operation includes a send operation, which causes the packet processing circuitry to read a work queue element (WQE) posted by the host processor in a receive queue, to write the second data to a buffer specified by the WQE, and after writing the second data, to write a completion queue element (CQE) to the host memory. In a disclosed embodiment, the packet processing circuitry is configured to queue non-posted operations for execution in a response queue, including the non-posted send operation, and to acknowledge the non-posted send operation to the sending node only after any preceding operations in the response queue have been completed In a disclosed embodiment, the packet processing circuitry is configured to queue non-posted operations for execution in a response queue, including the non-posted write operation, and to block execution of the non-posted write operation and acknowledgment of the non-posted write operation to the sending node until at least one preceding operation in the response queue has been completed. The at least one preceding operation can include a flush operation or an RDMA read operation.

Additionally or alternatively, the packet processing circuitry is configured to write a completion queue element (CQE) to the host memory upon writing the second data to the host memory, while enabling the host processor to access the CQE only after completion of any preceding operations in the response queue. In a disclosed embodiment, the packet processing circuitry is configured to queue the CQE in a completion queue in order with CQEs of the preceding operations in the response queue.

In some embodiments, the host memory includes a volatile memory and a target memory, and the data packets include a third packet conveying a flush operation following the posted write operation and preceding the non-posted write operation in the sequential order, wherein the flush operation causes the first data to be flushed from the volatile memory to the target memory. The packet processing circuitry is configured to delay the execution of the non-posted write operation until a notification that the flush operation has been completed is received via the host interface.

In a disclosed embodiment, the packet processing circuitry is configured to queue the flush operation in a response queue, and to transmit a flush acknowledgment of the flush operation to the sending node only after having received the notification that the flush operation was completed, and to queue the non-posted write operation in the response queue after the flush operation, so that the non-posted write operation is executed and acknowledged to the sending node only after the flush acknowledgment has been transmitted.

In some embodiments, the first data include an update to a record in a database maintained in the host memory, and wherein the second data include an update to a pointer, which points to the updated record. In a disclosed embodiment, the data packets include a fourth packet conveying a further flush operation following the non-posted write operation in the sequential order, wherein the further flush operation causes the update to the pointer to be flushed from the volatile memory to the target memory. The packet processing circuitry is configured to receive an additional notification via the host interface that the further flush operation has been completed, and to transmit a flush acknowledgment of the further flush operation to the sending node after receiving the additional notification so as to inform the sending node that a two-phase commit of the update has been completed. The data packets may include a fifth packet conveying a non-posted send operation following the further flush operation in the sequential order, and the packet processing circuitry is configured, after executing the non-posted send operation, to write a completion queue element (CQE) to the host memory so as to inform the host processor that the two-phase commit of the update has been completed.

In another embodiment, the packet processing circuitry is configured to negotiate with the sending node so as to set a maximum buffer allocation for outstanding non-posted write operations, whereby the sending node stalls new non-posted write operations in order to avoid exceeding the maximum buffer allocation.

There is also provided, in accordance with an embodiment of the invention, a method for communication, which includes receiving over a network in a network interface controller (NIC), which is coupled to a host processor having a host memory, data packets from a sending node conveying operations for execution in a sequential order on a predefined queue pair (QP), including at least a first packet conveying a posted write operation and a second packet conveying a non-posted write operation. In response to the first packet, the NIC executes the posted write operation in accordance with the sequential order so as to write first data to the host memory prior to the execution of any subsequent operations in the sequential order. In response to the second packet, the NIC executes the non-posted write operation so as to write second data to the host memory while allowing one or more of the subsequent operations in the sequential order to be executed prior to completion of writing the second data.

There is additionally provided, in accordance with an embodiment of the invention, a communication system, which includes a first computer, including a first network interface controller (NIC), which is configured to transmit over a network data packets conveying operations for execution in a sequential order on a predefined queue pair (QP), including at least a first packet conveying a posted write operation and a second packet conveying a non-posted write operation. A second computer includes a host memory and a second NIC, which is configured to receive the data packets from the first computer and, responsively to the data packets, to execute the posted write operation in accordance with the sequential order so as to write first data to the host memory prior to the execution of any subsequent operations in the sequential order, and to execute the non-posted write operation so as to write second data to the host memory while allowing one or more of the subsequent operations in the sequential order to be executed prior to completion of writing the second data.

Typically, the second computer includes a central processing unit (CPU), and the second NIC is configured to execute the posted and non-posted write operations without interrupting the CPU.

The present invention will be more fully understood from the following detailed description of the embodiments thereof, taken together with the drawings in which:

DETAILED DESCRIPTION OF EMBODIMENTS

Figure 1:
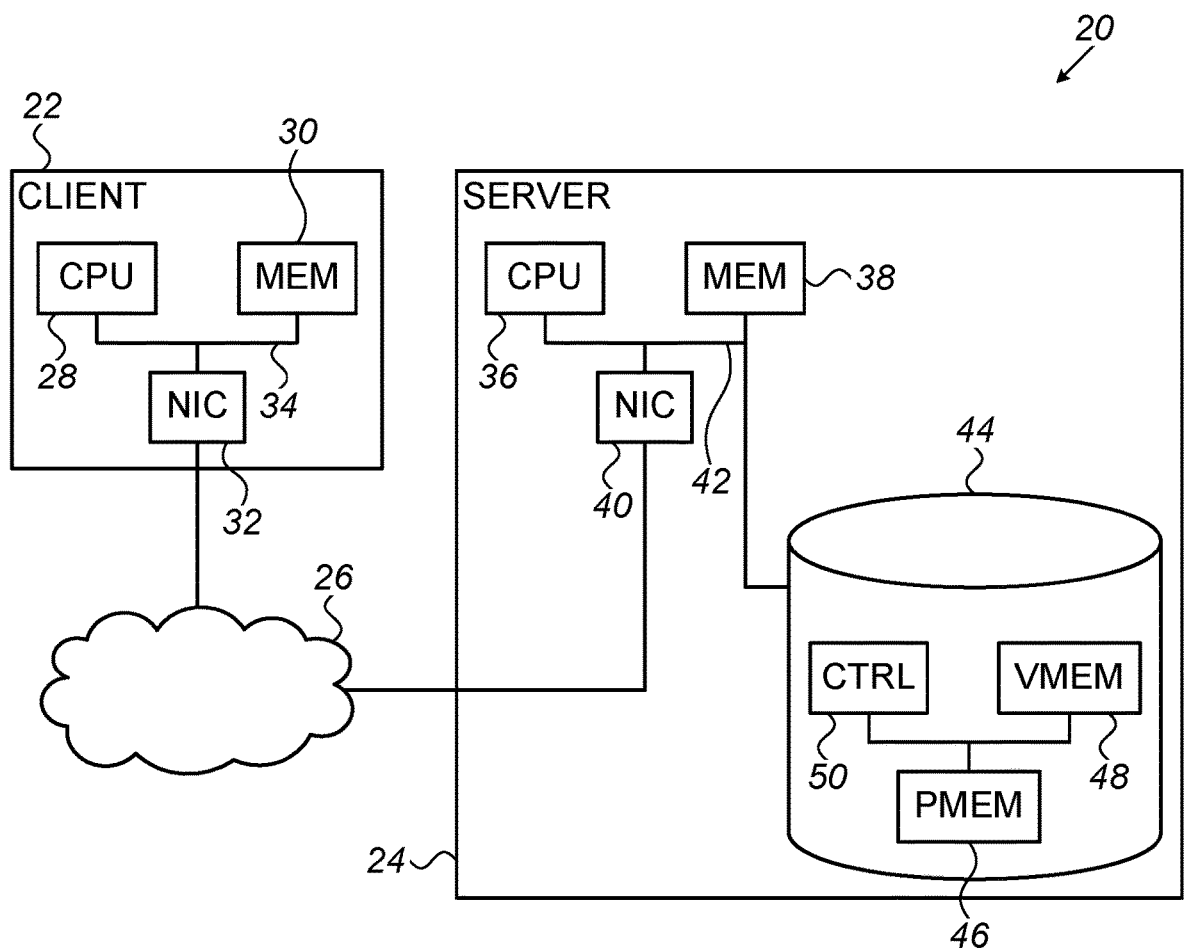
FIG. 1 is a block diagram that schematically illustrates a computer system, in accordance with an embodiment of the invention.

U.S. patent application Ser. No. 15/058,262, filed Mar. 2, 2016, whose disclosure is incorporated herein by reference, describes techniques that enable a NIC writing data over a bus to a target memory device to make sure that the data have actually been flushed to the target memory. These techniques are particularly, but not exclusively, when the target device comprises persistent memory. The term "persistent memory" is used in the context of the present description and in the claims to denote any sort of memory that retains the data when power is turned off, and more particularly to memory that supports random-access writing and reading of data to and from the memory and retains the data when power is off. Examples of persistent memory that are currently in use include various types of non-volatile random-access memory (NVRAM), including flash memory, as well as battery-backed RAM devices.

In this context, U.S. patent application Ser. No. 15/058,262 describes a novel RDMA flush operation, which can be used to ensure that data written by a peer node across a network are actually written to the target memory, rather than possibly remaining in a volatile memory buffer, which could be lost in case of power failure, for example. A peer NIC deployed at the peer node transmits RDMA write and flush packets over the network in response to RDMA write and flush work requests submitted to the peer NIC by an application program running on the peer node. The NIC on the receiving side will then verify that the data have been written and actually flushed to the target memory before signaling to the peer NIC that the operations have been completed. This entire process of writing and then flushing data can be carried out without interrupting the central processing unit (CPU) on the receiving side.

The RDMA flush operation is useful, for example, in applications that use distributed storage, such as distributed database applications. Such applications frequently use a two-phase commit protocol in order to ensure data consistency among nodes: The sending node first sends a data update of a certain database record (or other data item) to the receiving node, for example by RDMA write, and waits for the receiving node to acknowledge that the updated data have been received and stored. The RDMA write request specifies an address in the memory of the receiving node to which the updated data are to be written, while leaving the previous data of this record intact. Only after receiving the RDMA write acknowledgment does the sending node send a pointer update, which causes the receiving node to update the pointer for the record in question to point to the new data instead of the previous data. To ensure that the data have been safely stored at the receiving node, the sending node can send an RDMA flush packet after the RDMA write packets and then wait for the flush acknowledgment from the receiving node before sending the pointer update.

The risk remains, however, that another RDMA write operation will overwrite the data in the memory of the receiving node before the pointer has been updated, or that the pointer will bypass the data due packets arriving out of order, with the result that data consistency will be lost. (This risk can be mitigated using "fencing" techniques that are known in the art, but these techniques can add substantial latency in execution of transactions.) The reason for this problem is the distinction in RDMA transport protocols, such as the InfiniBand (IB) protocol, between posted and non-posted operations: Posted operations on a given QP will always be executed by the responder (the receiving node in the above example) in the order in which they were sent by requester (the sending node) and cannot be bypassed in the responder's execution queue by any other operations. Non-posted operations are not subject to this guarantee, meaning that the responder may execute a later posted operation before completing a given non-posted operation. These ordering rules are described further in section 10.8.3 of the above-mentioned InfiniBand Architecture Specification, and are summarized in Table 79 in this section of the specification. Examples of posted operations include RDMA write and send operations, while RDMA read operations are non-posted.

Because of its potentially long execution time at the responder, RDMA flush has been implemented as a non-posted operation in order to avoid network back-pressure. To obviate the risk of inconsistent pointer update in a two-phase commit operation, the RDMA flush may be fenced, as noted above, meaning that subsequent operations will be delayed until the flush is completed and the pointer updated. This solution, however, can lead to substantial delays in completion of the two-phase commit operation, as well as in subsequent operations that are directed to the responder, along with underutilization of bandwidth because the transmission on the QP in question stops until the flush is executed.

Embodiments of the present invention that are described herein address these shortcomings by introducing new types of non-posted InfiniBand operations for writing data from a requester (sending node) to a responder (receiving node). These new non-posted operations include, for example, non-posted RDMA write, non-posted atomic operations, and non-posted send. Like other non-posted operations, they can be bypassed by posted operations but maintain ordering of execution and completion relative to preceding non-posted operations requested by the sending node. Thus, in submitting work requests to send data to a receiving node, the requesting client process has the option of specifying that a given operation will be posted or non-posted. As an example of the use of these new operations, a specific mixture of posted and non-posted operations that can be used in an efficient RDMA-based implementation of a two-phase commit protocol is described in detail hereinbelow. The novel non-posted operations provided by embodiments of the present invention, however, are not limited to this particular implementation or protocol and can be used in a range of other data transfer applications.

The description below relates particularly to handling of posted and non-posted operations by a responding NIC, which comprises a host interface coupled to a host processor having a host memory (possibly including persistent memory) and a network interface, which receives data packets over a network from a sending node. These received packets convey operations for execution in a sequential order on a predefined queue pair (QP), including at least a first packet conveying a posted write operation and a second packet conveying a non-posted write operation. The term "write operation," as explained above, can be an RDMA write, send, or atomic operation, for example. (RDMA write and send differ from atomic operations in the sense that in atomic operations, the NIC is required to preserve the target data for repeated operations and send a response with the data to the requester, whereas in RDMA write and send operations, the responder send only an acknowledgment. For this reason, atomic operations are defined in the InfiniBand Specification as non-posted but are subject to the ordering restrictions of posted operations. The new non-posted atomic operations that are provided by embodiments of the present invention are not subject to these restrictions and are thus useful, for example, in preventing backpressure in executing sequential read-modify-write operations.)

The description that follows refers, for the sake of simplicity and clarity, to packets received by the NIC on a single QP from a single sending node; but in general the NIC will implement the disclosed techniques and principles on multiples QPs, serving multiple different sending nodes concurrently.

Packet processing circuitry in the NIC executes the posted write operation conveyed by the first packet in accordance with the sequential order of incoming operations, and thus writes the data from the sending node to the host memory prior to the execution of any subsequent operations in the sequential order. On the other hand, in executing the non-posted write operation of the second packet, and thus writing the corresponding data to the host memory, the packet processing circuitry may allow one or more subsequent operations in the sequential order—such as subsequent posted operations—to be executed before the non-posted write is completed. Even when the data in non-posted write operations are written to the host memory out of order, however, completion of the operations is reported locally to the host processor and acknowledged to the sending node in the original order of the non-posted write requests. The proper ordering of completion and acknowledgment can be maintained, for example, by holding the non-posted operations in a response queue until any preceding non-posted operations have been completed, as explained in detail hereinbelow.

The operations received by the NIC from the sending node will sometimes include a flush packet, conveying an RDMA flush operation, following the posted write operation and preceding the non-posted write operation in the sequential order. (Alternatively, an RDMA read operation could be requested by the sending node for this purpose.) In response to the flush packet, the packet processing circuitry will send a flush command over the host bus of the receiving node, which will cause the data conveyed by the preceding posted write operation to be flushed from volatile memory to persistent memory. The packet processing circuitry will delay the execution of the subsequent non-posted write operation, however, until it has received, via the host interface, a flush completion notification, indicating that the flush operation in the memory has been completed.

In an example embodiment, the data conveyed by the posted write operation comprise an update to a record in a database maintained in the memory of the receiving node, while the data in the non-posted write comprise an update to a pointer, which points to the updated record. The sending node may thus transmit the non-posted pointer update immediately after transmitting a flush packet, without having to fence or wait for a flush acknowledgment from the receiving node. The packet processing circuitry of the receiving NIC will ensure that the pointer update is executed only after the flush has actually been completed. This approach makes it possible to implement data consistency protocols, such as a two-phase commit protocol, with enhanced efficiency and with reduced latency and network bottlenecks relative to techniques that are known in the art.

FIG. 1 is a block diagram that schematically illustrates a computer system 20, in accordance with an embodiment of the invention. System 20 comprises computers 22 and 24, which are connected as nodes of a network 26. For the sake of simplicity, only two computers 22 and 24 are shown in FIG. 1, and only the components of computer 24 are shown in detail. In practice, system 20 typically comprises a large number of computers, each of which may be constructed and operate in a manner similar to computer 24. Network 26 is a packet data network, such as a suitable InfiniBand or Ethernet network, which is capable of RDMA transport. For the sake of the description of a two-phase commit protocol that is presented below, computer 22 is referred to as a client, while computer 24 is referred to as a server; but the principles of this embodiment may similarly be applied in other applications, such as in data transfer between peer computers.

Computer 22 comprises a CPU 28 and a system memory 30. CPU 28 and memory 30 are connected by a peripheral component bus 34 to a NIC 32, which couples computer 22 to network and thus communicates with NICs of other nodes, including a NIC 40 of computer 24. NIC 32 and NIC 40 exchange RDMA requests and responses over transport service instances established between the NICs. In the context of InfiniBand and some other RDMA protocols, the transport service instances take the form of queue pairs (QPs), which enable software processes running on computer 22 to store and read data to and from computer 24.

Computer 24 likewise comprises a CPU 36 and a system memory 38, connected to NIC 40 by a bus 42, such as a Peripheral Component Interconnect (PCI) Express® bus. Computer 24 also comprises a persistent memory device 44, which is connected to bus 42. Device 44 comprises one or more memory chips, including a target memory, such as a persistent memory (PMEM) 46, and a volatile buffer memory (VMEM) 48, which typically comprises RAM. A memory controller 50 receives and transmits data and instructions over bus 34 and controls the operation of persistent memory and buffer memory 48. These operations specifically include flushing of data from the buffer memory to the persistent memory. Device 44 exposes a memory address space on bus 42, enabling other entities, including both software processes and hardware components, such as NIC 40, to read from and write to specified addresses in the address space via the bus (although these operations are not always carried out in order in device 44, giving rise to problems that are addressed by the present embodiments). In this sense, device 44 can be considered a part of the host memory of computer 24. Further aspects of the operation of device 44 in receiving and flushing data to persistent memory 46 are described, for example, in the above-mentioned U.S. patent application Ser. No. 15/058,262.

Figure 2:
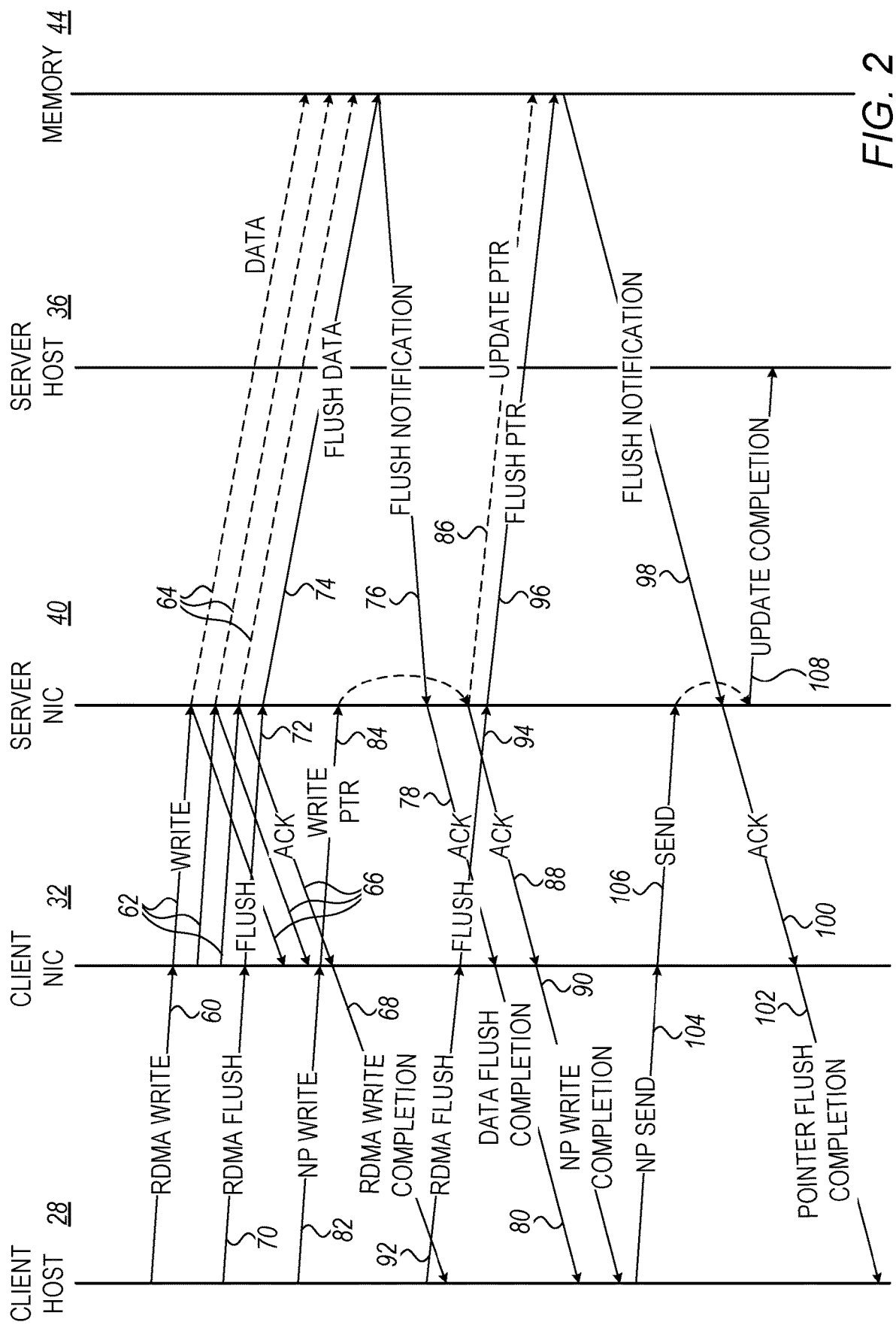
FIG. 2 is a ladder diagram that schematically illustrates a method for writing data over a network in a two-phase commit procedure, in accordance with an embodiment of the invention.

FIG. 2 is a ladder diagram that schematically illustrates a method for writing data over a network in a two-phase commit procedure, in accordance with an embodiment of the invention. For the sake of concreteness and clarity, the components involved in the operations in FIG. 2 are taken to be those that are shown in FIG. 1, as described hereinabove. Alternatively, however, the flow of communications and operations illustrated in FIG. 2 may be implemented in other sorts of system architectures that are known in the art.

The procedure of FIG. 2 is initiated by a process running on CPU 28 of client computer 22, which submits an RDMA write work request 60 containing data for update of a record maintained in memory device 44. Request 60 causes NIC 32 to transmit one or more RDMA write packets 62 over network 26 to NIC 40, containing the data indicated in work request 60. Upon receiving these packets 62 on a given QP, NIC 40 writes the data over bus 42 to the specified addresses in memory device 44, in one or more bus transactions 64. NIC 40 returns one or more RDMA write acknowledgments 66 to NIC 32. Upon receiving acknowledgment of all of RDMA write packets 62, NIC 32 issues a write completion report 68 (such as a CQE) to CPU 28 of client computer 22.

Following RDMA write work request 60 (but without having to wait for completion report 68), CPU 28 of client computer 22 submits an RDMA flush work request 70 to NIC 32, causing NIC 32 to transmit an RDMA flush packet 72 to NIC 40. Upon receiving RDMA flush packet 72, NIC 40 initiates a flush transaction 74 over bus 42, directed to the memory region in device 44 to which the RDMA data were written in transactions 64. In response to flush transaction 74, memory controller 50 carries out the appropriate flush operation, by flushing buffered data to persistent memory 46, for example. Upon completion of the flush, memory controller 50 returns a flush notification 76 over bus 42 to NIC 40, indicating that the data have been flushed as required. NIC 40 returns a flush acknowledgment 78 to NIC 32, which then issues a flush completion report 80 to the CPU 28.

Following RDMA flush request 70 (but once again, without having to wait for flush completion report 80), CPU 28 submits a non-posted (NP) write work request 82 to NIC 32, containing data for update of the pointer to the record data that was updated in memory device 44 by RDMA write request 60. This non-posted write operation may comprise a non-posted RDMA write operation, for example, specifying the address in memory device 44 to which the pointer is to be written. NIC 40 will have to buffer these non-posted write operations, and therefore NIC 32 and NIC 40 should negotiate in advance a maximum buffer allocation governing the size and number of buffers to be reserved for these writes. This negotiation may use mechanisms that are known in the art for negotiating the number of outstanding read and/or atomic operations, or alternative a different sort of mechanism. NICs 32 and 40 may negotiate either a fixed size per outstanding non-posted operation or an aggregated buffer for all of the outstanding non-posted writes. In this latter case, NIC 32, as the requester, should count the aggregated outstanding length. NIC should then stall new requests as necessary in order to avoid exceeding the maximum permitted number of operations and/or the maximum permitted size of the outstanding non-posted write operations.

Alternatively, the non-posted write operation may comprise an RDMA atomic operation, which will cause NIC 40 to read a pointer value from a specified address in memory device 44 and on the basis of this existing value, to write a new value to the specified address. (Another possible non-posted write operation is a non-posted send, which is described further hereinbelow.) In response to this work request 82, NIC 32 sends a non-posted write packet 84 containing the pointer update to NIC 40.

NIC 40, however, does not execute the non-posted write operation immediately, but rather delays the execution of the non-posted write operation until it has received flush notification 76 from memory device 44. (A mechanism that can be used conveniently in NIC 40 to implement this delay is described below with reference to FIG. 3.) Only at this point does NIC 40 write the pointer update over bus 42 to the specified addresses in memory device 44, in a bus transaction 86. NIC 40 also returns an RDMA write acknowledgment 88 to NIC 32, which cause NIC 32 to issue a write completion report 90 to CPU 28 of client computer 22, indicating that the non-posted write operation has been executed.

To ensure that the pointer update has also been saved in persistent memory 46, CPU 28 may initiate a further flush operation by submitting another RDMA flush work request 92 following non-posted write request 82. In response to work request 92, NIC 32 transmits another RDMA flush packet 94 over network 26 to NIC 40, which causes NIC 40 to initiate a flush transaction 96 over bus 42 and thus flush the update to the pointer from volatile memory 48 to persistent memory 46. Again, CPU 28 may submit work request 92 immediately after non-posted write request 82, without having to wait for write acknowledgment 88 and completion report 90, because NIC 40 will ensure that the flush will occur, in the proper sequential order, only after the pointer update has been written to memory device 44 in bus transaction 86.

Upon completion of this flush, memory controller 50 returns another flush notification 98 over bus 42 to NIC 40, indicating that the pointer has been flushed as required. NIC 40 then returns a flush acknowledgment 100 to NIC 32, which issues a flush completion report 102 to CPU 28. Thus, CPU 28 is assured that the two-phase commit of the data update has been completed.

In some situations, it may be desirable to inform CPU 36 of server 24, as well, that the data update has been completed and committed (for example, if an application on server 24 is waiting to process the data). Although it is possible for CPU 28 simply to transmit an additional message to server 24 after receiving flush completion report 102, the information can be conveyed more efficiently, with lower latency and enhanced bandwidth, using a non-posted send operation. For this purpose, following RDMA flush work request 92, CPU submits a non-posted send work request 104, which causes NIC 32 to transmit a non-posted send packet 106 to NIC 40, on the same QP as all the preceding packets in the two-phase commit procedure described above. In response to the non-posted send request, NIC 40 will scatter the data in the send packet in order with earlier posted operations, but will queue the corresponding CQE in order with those of other non-posted operations.

Because the send operation invoked by packet 106 is non-posted, NIC 40 will consume a receive WQE and execute the second operation in order with the posted operations, and will thus scatter the packet data in the same order as any other posted operation. For multi-packet send operations, the first and middle packets are handled in the same way as any other send, and NIC 40 will issue a CQE after scattering the data from the last packet (or the only packet in single-packet send operations). This CQE will be delayed until the execution of the previous non-posted operations. (RDMA write with immediate operation are handled in similar fashion.) Thus, NIC 40 will complete the non-posted send only after the preceding flush transaction 96 has been completed, i.e., after receiving flush notification 98 from memory device 44. Techniques and data structures that can be used to ensure that completions are reported in the proper order are described further hereinbelow.

At this point, NIC 40 will write the data payload of send packet 106 to a buffer indicated by a WQE read by the NIC from the receive queue of the QP in question on server 24. After writing the payload data, and thus executing the non-posted send operation, NIC 40 writes a completion queue element (CQE) 108 to host memory 38, and thus informs CPU that the two-phase commit of the update has been completed.

Figure 3:
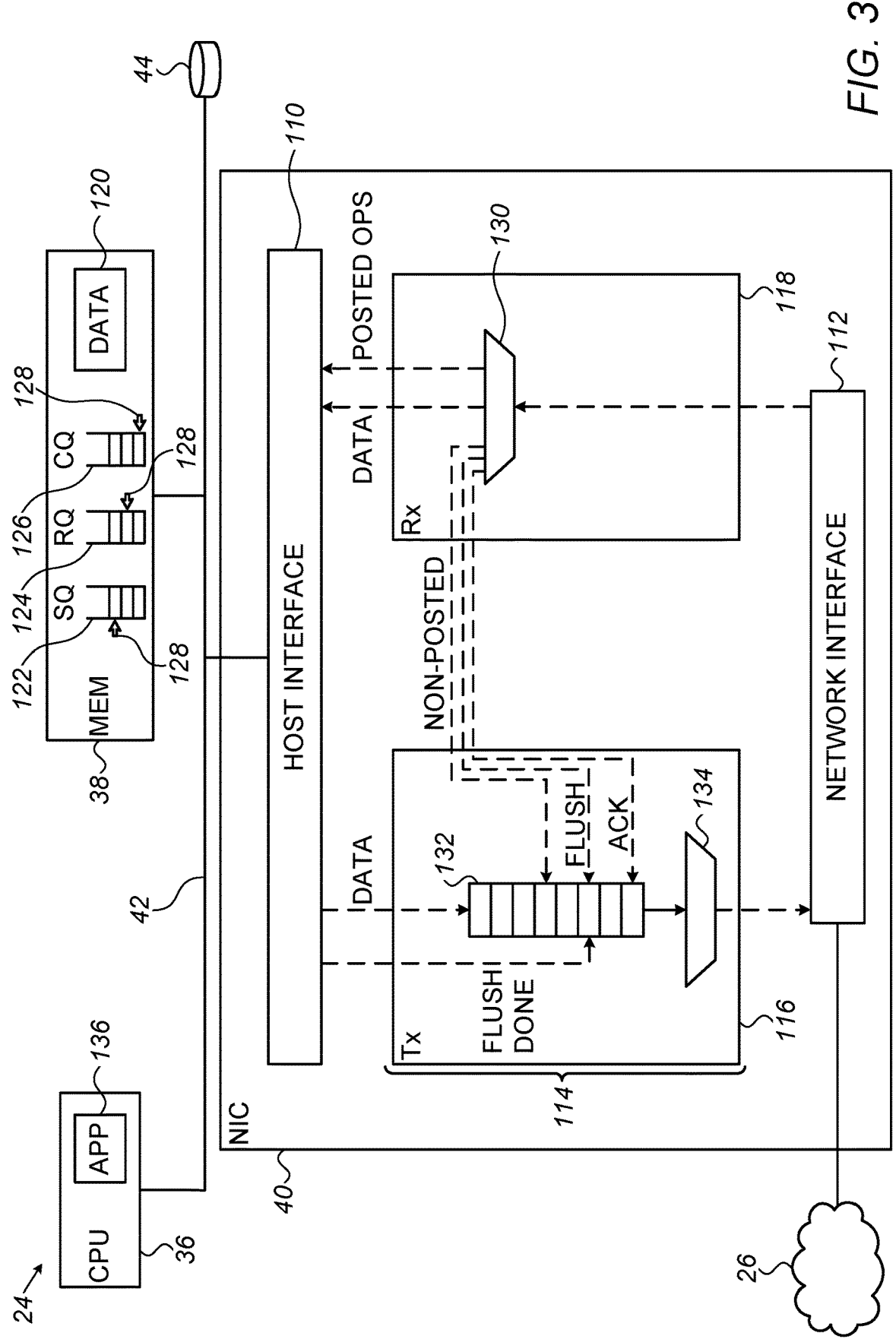
FIG. 3 is a block diagram that schematically shows details of a network interface controller (NIC), in accordance with an embodiment of the invention.

FIG. 3 is a block diagram that schematically shows details of NIC 40, in accordance with an embodiment of the invention. This diagram illustrates only certain features of the NIC that are relevant to a particular technique, which is described below, for handling incoming non-posted write operations. Other elements of NIC 40 are omitted for the sake of simplicity and will be apparent to those skilled in the art. Alternative implementations of responder logic for handling non-posted write operations will be apparent to those skilled in the art after reading the present description and are considered to be within the scope of the present invention.

As noted earlier, NIC 40 comprises a host interface 110, which connects to bus 42, and a network interface 112, connected to network 26. Packet processing circuitry 114 in NIC 40 is coupled between interfaces 110 and 112 and comprises transmit (Tx) logic 116 and receive (Rx) logic 118, which access the host memory via host interface 100 in order to write data to and read data from buffers 120 (in both memory 38 and memory device 44). Packet processing circuitry 114 interacts with client processes running on CPU 36, such as a database application 136, by reading and executing WQEs from queue pairs (QPs), each comprising a send queue (SQ) 122 and a receive queue (RQ) 124. Upon completing execution of a WQE, packet processing circuitry 114 writes a CQE to a completion queue (CQ) 126. Pointers 128 indicate to NIC 40 and to processes running on CPU 36 where the next elements should be read from and written to queues 122, 124 and 126.

A packet parser 130 in receive logic 118 reads header fields of incoming packets from network interface 112 in order to decide how the packet should be handled. Typically, each type of operation, including both posted and non-posted versions of write operations, has its own operation code (opcode) in the corresponding packet transport header, which enables parser 130 to determine whether it is posted or non-posted. Parser 130 passes posted operations to host interface 110 for immediate execution, in the order in which the operations are received, and writes incoming data to buffers 120. In addition, after processing incoming packets, receive logic 118 generates acknowledgments (ACK) and places outgoing response packets to be transmitted by NIC 40 in a response queue 132 maintained by transmit logic 116. An arbiter 134 selects and transmits the packets from queue 132 in the proper order. Although only a single response queue is shown in FIG. 3, transmit logic 116 typically maintains multiple response queues for handling multiple QPs concurrently.

In contrast to its handling of posted operations, parser 130 places non-posted operations in response queue 132 for handling. Thus, for example, transmit logic 116 will send an outgoing RDMA read response packet only when it has reached the head of queue 132 and the corresponding data have been read from the appropriate buffer 120. By the same token, upon receiving an RDMA flush packet, parser 130 queues the flush operation in response queue 132, and will transmit the corresponding flush acknowledgment to the sending node only after having received a notification from host interface 110 that the flush operation was actually completed by memory device 44. Thus, queue 132 may be stalled until the flush operation is done. Meanwhile, any non-posted write operations in response queue 132 will likewise be stalled behind the flush operation, and will be executed and acknowledged to the sending node only after the flush acknowledgment has been transmitted, as was illustrated above in FIG. 2. For this reason, non-posted send packets transmitted by NIC 32 should be limited to a size small enough to fit in response queue 132 while awaiting their turn for data scattering.

Parser 130 places non-posted send operations in response queue 132, as well. To handle these operations, NIC 40 reads a WQE from receive queue 124 and writes the payload data of the send packet to a buffer address indicated by the WQE. To avoid having to transfer the data from one buffer to another, packet processing circuitry 114 may read the WQE and write the data to the buffer immediately, although completion of the send operation will wait until it reaches the head of response queue 132. Packet processing circuitry 114 may also reserve a CQE for the non-posted send operation in completion queue 126, but meanwhile does not advance pointer 128 so that CPU 36 will not read the CQE until the operation has actually been completed. In other words, the receive WQEs in receive queue 124 are consumed and data are scattered accordingly to buffers 120 in the order in which the incoming send packets are received from network 26 (before posting in response queue 132). Completion and acknowledgment of the send operations, however, is queued in order with other non-posted operations and is reported in this order to CPU 136, as well as to the sending node. In other words, CPU 36 is enabled to access a given CQE only after completion of any preceding operations in response queue 132.

As packet processing circuitry 114 writes data to buffers 120, the packet processing circuitry also consumes and writes corresponding CQEs. Packet processing circuitry 114 reserves CQEs for non-posted operations as incoming requests are received from network 26, in the proper request order, but will finish writing the CQEs and mark them valid only when the corresponding operations reach the head of response queue 132. (The CQEs may be written directly to completion queue 126 but marked invalid, or alternatively, the CQEs that are not yet valid may be held in a temporary buffer.) In one embodiment, software running on CPU 36 (such as application 136 or a NIC driver, which with the application interacts) polls completion queue 126, for example by checking whether the CQE at the head of the queue, as indicated by pointer 128, is valid. In another embodiment, NIC 40 signals an interrupt to CPU 36 only when the CQE at the head of the completion queue has been validly written. In either case, once the CQE at the head of completion queue 126 is valid, the software running on the CPU will be able to read all of the outstanding valid CQEs in the proper order.

The non-posted send operation will wait for completion and response of some preceding operations (for example, flush operations, as explained above), but may not wait for completion and response of others, such as RDMA read operations. Although the operations are started in order, multiple operations may be executed in parallel. Responses, however, will still be sent in order. Execution of non-posted send operations are stalled until the completion of preceding flush operations, for example, but do not wait for completion of RDMA read and non-posted write operations.

When the non-posted send operation reaches its turn in response queue 132, transmit logic 116 transmits an acknowledgment over network 26 to the sending node, writes to the reserved CQE, and advance pointer 128. At this point, CPU 36 is able to read the CQE (along with any CQEs written subsequently to completion queue 126). In this manner, for example, NIC 40 can inform application 136 that a data record has been updated and committed in memory device 44, as illustrated by CQE 108 in FIG. 2. CPU 36 need not be involved at all in either the update or commitment phase, and application 136 is informed of the update only after commitment is complete.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Communication apparatus, comprising:
a host interface, configured to be coupled to a host processor having a host memory;
a network interface, which is configured to receive over a network from a sending node data packets conveying operations for execution in a sequential order on a predefined queue pair (QP), the packets comprising respective transport headers, which contain respective operation codes identifying different types of the operations, including at least a first packet conveying a first write operation of a first type identified by a first operation code and a second packet conveying a second write operation of a second type identified a second operation code; and packet processing circuitry, which is configured to parse the transport headers and, responsively to the first and second operation codes in the respective transport headers, to execute the first write operation in accordance with the sequential order so as to write first data to the host memory prior to the execution of any subsequent operations in the sequential order, and to execute the write operation so as to write second data to the host memory while allowing one or more of the subsequent operations in the sequential order to be executed prior to completion of writing the second data.

2. The apparatus according to claim 1, wherein the second write operation comprises a remote direct memory access (RDMA) write operation.

3. The apparatus according to claim 2, wherein the RDMA write operation comprises a non-posted RDMA write with immediate operation, which causes the packet processing circuitry to write the second data to the host memory while queuing the RDMA write in a response queue, and to write a completion queue element (CQE) to the host memory only after execution and completion of one or more preceding operations of the second type.

4. The apparatus according to claim 1, wherein the second write operation comprises a non-posted atomic operation, which causes the packet processing circuitry to read a first value from a specified address in the host memory and responsively to the first value, to write a second value to the specified address.

5. The apparatus according to claim 4, wherein the packet processing circuitry is configured to queue operations of the second type for execution in a response queue, including the non-posted atomic operation, and to block execution of the non-posted atomic operation and acknowledgment of the non-posted atomic operation to the sending node until at least one preceding operation of the second type in the response queue has been completed.

6. The apparatus according to claim 1, wherein the second write operation comprises a non-posted send operation, which causes the packet processing circuitry to read a work queue element (WQE) posted by the host processor in a receive queue, to write the second data to a buffer specified by the WQE, and after writing the second data, to write a completion queue element (CQE) to the host memory.

7. The apparatus according to claim 6, wherein the packet processing circuitry is configured to queue operations of the second type for execution in a response queue, including the non-posted send operation, and to acknowledge the non-posted send operation to the sending node only after any preceding operations in the response queue have been completed.

8. The apparatus according to claim 1, wherein the packet processing circuitry is configured to queue operations of the second type for execution in a response queue, including the second write operation, and to block execution of the second write operation and acknowledgment of the second write operation to the sending node until at least one preceding operation has been completed.

9. The apparatus according to claim 8, wherein the at least one preceding operation comprises a flush operation.

10. The apparatus according to claim 8, wherein the at least one preceding operation comprises an RDMA read operation.

11. The apparatus according to claim 8, wherein the at least one preceding operation comprises a write operation of the second type.

12. The apparatus according to claim 1, wherein the packet processing circuitry is configured to queue operations of the second type for execution in a response queue, including the second write operation, and to write a completion queue element (CQE) to the host memory upon writing the second data to the host memory, while enabling the host processor to access the CQE only after completion of any preceding operations in the response queue.

13. The apparatus according to claim 12, wherein the packet processing circuitry is configured to queue the CQE in a completion queue in order with CQEs of the preceding operations in the response queue.

14. The apparatus according to claim 1, wherein the host memory comprises a volatile memory and a target memory, and wherein the data packets include a third packet conveying a flush operation following the first write operation and preceding the second write operation in the sequential order, wherein the flush operation causes the first data to be flushed from the volatile memory to the target memory, and wherein the packet processing circuitry is configured to delay the execution of the second write operation until a notification that the flush operation has been completed is received via the host interface.

15. The apparatus according to claim 14, wherein the packet processing circuitry is configured to queue the flush operation in a response queue, and to transmit a flush acknowledgment of the flush operation to the sending node only after having received the notification that the flush operation was completed, and to queue the second write operation in the response queue after the flush operation, so that the second write operation is executed and acknowledged to the sending node only after the flush acknowledgment has been transmitted.

16. The apparatus according to claim 14, wherein the first data comprise an update to a record in a database maintained in the host memory, and wherein the second data comprise an update to a pointer, which points to the updated record.

17. The apparatus according to claim 16, wherein the data packets include a fourth packet conveying a further flush operation following the second write operation in the sequential order, wherein the further flush operation causes the update to the pointer to be flushed from the volatile memory to the target memory, and wherein the packet processing circuitry is configured to receive an additional notification via the host interface that the further flush operation has been completed, and to transmit a flush acknowledgment of the further flush operation to the sending node after receiving the additional notification so as to inform the sending node that a two-phase commit of the update has been completed.

18. The apparatus according to claim 17, wherein the data packets include a fifth packet conveying a send operation of the second type following the further flush operation in the sequential order, and wherein the packet processing circuitry is configured, after executing the send operation, to write a completion queue element (CQE) to the host memory so as to inform the host processor that the two-phase commit of the update has been completed.

19. The apparatus according to claim 1, wherein the packet processing circuitry is configured to negotiate with the sending node so as to set a maximum buffer allocation for outstanding write operations of the second type, whereby the sending node stalls new write operations of the second type in order to avoid exceeding the maximum buffer allocation.

20. A method for communication, comprising:
receiving over a network in a network interface controller (NIC), which is coupled to a host processor having a host memory, data packets from a sending node conveying operations for execution in a sequential order on a predefined queue pair (QP), the packets comprising respective transport headers, which contain respective operation codes identifying different types of the operations, including at least a first packet having a first transport header and conveying a first write operation of a first type identified by a first operation code and a second packet having a second transport header and conveying a second write operation of a second type identified a second operation code;
in response to the first packet, parsing the first transport header and, responsively to the first operation code in the first transport header, executing the first write operation by the NIC in accordance with the sequential order so as to write first data to the host memory prior to the execution of any subsequent operations in the sequential order; and
in response to the second packet, parsing the second transport header and, responsively to the second operation code in the second transport header, executing the second write operation by the NIC so as to write second data to the host memory while allowing one or more of the subsequent operations in the sequential order to be executed prior to completion of writing the second data.

21. The method according to claim 20, wherein the second write operation comprises a remote direct memory access (RDMA) write operation.

22. The method according to claim 21, wherein the RDMA write operation comprises a non-posted RDMA write with immediate operation, which causes the NIC to write the second data to the host memory while queuing the RDMA write in a response queue, and to write a completion queue element (CQE) to the host memory only after execution and completion of one or more preceding operations of the second type.

23. The method according to claim 20, wherein the second write operation comprises a non-posted atomic operation, which causes the NIC to read a first value from a specified address in the host memory and responsively to the first value, to write a second value to the specified address.

24. The method according to claim 23, wherein executing the non-posted atomic operation comprises queuing operations of the second type for execution in a response queue, including the non-posted atomic operation, and blocking execution of the non-posted atomic operation and acknowledgment of the non-posted atomic operation to the sending node until at least one preceding operation of the second type in the response queue has been completed.

25. The method according to claim 20, wherein the second write operation comprises a non-posted send operation, which causes the NIC to read a work queue element (WQE) posted by the host processor in a receive queue, to write the second data to a buffer specified by the WQE, and after writing the second data, to write a completion queue element (CQE) to the host memory.

26. The method according to claim 25, wherein executing the non-posted send operation comprises queuing operations of the second type for execution in a response queue, including the non-posted send operation, and acknowledging the non-posted send operation to the sending node only after any preceding operations in the response queue have been completed.

27. The method according to claim 20, and comprising queuing operations for execution in a response queue of the NIC, including the second write operation, and blocking execution of the second write operation and acknowledgment of the second write operation to the sending node until at least one preceding operation has been completed.

28. The apparatus according to claim 27, wherein the at least one preceding operation comprises a flush operation.

29. The apparatus according to claim 27, wherein the at least one preceding operation comprises an RDMA read operation.

30. The apparatus according to claim 27, wherein the at least one preceding operation comprises a write operation of the second type.

31. The method according to claim 20, wherein executing the second write operation comprises queuing operations of the second type for execution in a response queue, including the second write operation, and writing a completion queue element (CQE) to the host memory upon writing the second data to the host memory, while enabling the host processor to access the CQE only after completion of any preceding operations in the response queue.

32. The method according to claim 31, wherein writing the CQE comprises queuing the CQE in a completion queue in order with CQEs of the preceding operations in the response queue.

33. The method according to claim 21, wherein the host memory comprises a volatile memory and a target memory, and
wherein the data packets include a third packet conveying a flush operation following the first write operation and preceding the second write operation in the sequential order, wherein the flush operation causes the first data to be flushed from the volatile memory to the target memory, and
wherein executing the second write operation comprises delaying the execution of the second write operation by the NIC until a notification that the flush operation has been completed is received from the host memory.

34. The method according to claim 33, and comprising queuing the flush operation in a response queue of the NIC, and transmitting a flush acknowledgment of the flush operation from the NIC to the sending node only after having received the notification that the flush operation was completed,
wherein delaying the execution comprises queuing the second write operation in the response queue after the flush operation, so that the second write operation is executed and acknowledged to the sending node only after the flush acknowledgment has been transmitted.

35. The method according to claim 33, wherein the first data comprise an update to a record in a database maintained in the host memory, and wherein the second data comprise an update to a pointer, which points to the updated record.

36. The method according to claim 35, wherein the data packets include a fourth packet conveying a further flush operation following the second write operation in the sequential order, wherein the further flush operation causes the update to the pointer to be flushed from the volatile memory to the target memory, and wherein the method comprises receiving in the NIC an additional notification via the host interface that the further flush operation has been completed, and transmitting a flush acknowledgment of the further flush operation to the sending node after receiving the additional notification so as to inform the sending node that a two-phase commit of the update has been completed.

37. The method according to claim 36, wherein the data packets include a fifth packet conveying a send operation of the second type following the further flush operation in the sequential order, and wherein the method comprises, executing the send operation, and then writing a completion queue element (CQE) to the host memory so as to inform the host processor that the two-phase commit of the update has been completed.

38. The method according to claim 20, and comprising negotiating with the sending node so as to set a maximum buffer allocation for outstanding write operations of the second type, whereby the sending node stalls new write operations of the second type in order to avoid exceeding the maximum buffer allocation.

39. A communication system, comprising:

a first computer, comprising a first network interface controller (NIC), which is configured to transmit over a network data packets conveying operations for execution in a sequential order on a predefined queue pair (QP), the packets comprising respective transport headers, which contain respective operation codes identifying different types of the operations, including at least a first packet conveying a first write operation of a first type identified by a first operation code and a second packet conveying a second write operation of a second type identified a second operation code; and a second computer, comprising a host memory and a second NIC, which is configured to receive the data packets from the first computer, to parse the transport headers of the data packets, and, responsively to the first and second operation codes in the respective transport headers, to execute the first write operation in accordance with the sequential order so as to write first data to the host memory prior to the execution of any subsequent operations in the sequential order, and to execute the second write operation so as to write second data to the host memory while allowing one or more of the subsequent operations in the sequential order to be executed prior to completion of writing the second data.

40. The system according to claim 39, wherein the second computer comprises a central processing unit (CPU), and wherein the second NIC is configured to execute the first and second write operations without interrupting the CPU.

* * * * *